（12） United States Patent
Cameron et al.

(10) Patent No.: US 7,110,762 B1
(45) Date of Patent: *Sep. 19, 2006

(54) SYSTEM AND METHOD FOR USING CORRECTED SIGNALS FROM A GLOBAL POSITIONING SYSTEM TO PERFORM PRECISION SURVEY

(75) Inventors: John F. Cameron, Los Altos, CA (US); Mark D. Sellers, Santa Clara, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/833,380

(22) Filed: Apr. 28, 2004

Related U.S. Application Data

(63) Continuation of application No. 09/663,063, filed on Sep. 15, 2000, now Pat. No. 6,751,467.

(51) Int. Cl.
*H04B 7/00* (2006.01)

(52) U.S. Cl. .................. 455/434; 455/450; 455/64; 455/562.1; 455/456.1; 342/357.03; 701/214; 343/713

(58) Field of Classification Search ........ 455/516–517, 455/62–63, 456.1, 11.1, 562.1, 575.7, 226.1–226.2, 455/180.1, 179.1, 176.1, 226.4, 161.1, 450, 455/434, 452.1, 509, 456, 515, 513; 342/357.08, 342/357.03, 357.09; 343/343, 790, 713, 343/860, 745; 701/214–215, 204, 207
See application file for complete search history.

(56) References Cited

U.S. PATENT DOCUMENTS

| | | | | |
|---|---|---|---|---|
| 3,879,735 A | * | 4/1975 | Campbell et al. ........... | 343/792 |
| 4,980,924 A | * | 12/1990 | Reed et al. ............... | 455/226.1 |
| 4,996,715 A | * | 2/1991 | Marui et al. ............... | 455/421 |
| 5,523,761 A | * | 6/1996 | Gildea .................... | 342/357.03 |
| 5,525,999 A | * | 6/1996 | King et al. ............... | 342/357.03 |
| 5,563,607 A | * | 10/1996 | Loomis et al. ............ | 342/357.03 |
| 5,654,717 A | * | 8/1997 | Nichols et al. ........... | 342/357.06 |
| 5,719,587 A | * | 2/1998 | Rodal .................... | 343/791 |
| 5,731,788 A | * | 3/1998 | Reeds .................... | 342/357.07 |
| 5,748,145 A | * | 5/1998 | Talbot et al. ............ | 342/357.04 |
| 5,916,300 A | * | 6/1999 | Kirk et al. ............... | 701/213 |
| 5,957,717 A | * | 9/1999 | Monsef et al. ............. | 439/339 |
| 6,031,499 A | * | 2/2000 | Dichter .................. | 343/713 |
| 6,111,540 A | * | 8/2000 | Krasner .................. | 342/357.1 |
| 6,148,179 A | * | 11/2000 | Wright et al. .............. | 455/66.1 |
| 6,155,869 A | * | 12/2000 | Monsef et al. ............. | 439/500 |
| 6,294,992 B1 | * | 9/2001 | Addy et al. .............. | 340/539.3 |

(Continued)

*Primary Examiner*—Joseph Feild
*Assistant Examiner*—Kamran Afshar
(74) *Attorney, Agent, or Firm*—Jurgen Vollrath (57) ABSTRACT

In a differential global positioning system that includes one or more base stations and rover units, a system and method for including a radio modem transceiver in the rover units, and packaging several components, including the transceiver and a radio antenna in a single package, and possibly including re-chargeable batteries, a GPS receiver, and a GPS antenna in the package, to reduce the number of external electrical connections. Several of the components may be packaged into a survey range pole. GPS satellite correction information is transmitted from a base station in response to a request transmitted from the rover unit by means of the radio modem transceiver. Automatic channel selection is performed by the base stations to select a channel having low communication traffic. The rover units scan the available channels for valid GPS correction information and, in the event that more than one such channel is located, select the channel with the strongest signal.

18 Claims, 8 Drawing Sheets

U.S. PATENT DOCUMENTS

6,313,786 B1 * 11/2001 Sheynblat et al. ..... 342/357.02
6,314,366 B1 * 11/2001 Farmakis et al. ........... 701/201
6,369,755 B1 * 4/2002 Nichols et al. ........ 342/357.17
6,459,989 B1 * 10/2002 Kirkpatrick et al. ........ 701/215
6,512,928 B1 * 1/2003 Janky et al. ............. 455/456.6
6,751,467 B1 * 6/2004 Cameron et al. ........... 455/516

* cited by examiner

SYSTEM AND METHOD FOR USING CORRECTED SIGNALS FROM A GLOBAL POSITIONING SYSTEM TO PERFORM PRECISION SURVEY

This is a continuation application of previously filed application Ser. No. 09/663,063 that was filed on Sep. 15, 2000, now U.S. Pat. No. 6,751,467 under the same title as the present application.

BACKGROUND OF THE INVENTION

1. Field of the Invention

This invention relates to an improved system and method of using corrected signals from a Global Positioning System to perform precision surveying.

2. Discussion of the Prior Art

U.S. Pat. Nos. 5,519,620 and 5,602,741 describe some prior art Global Positioning systems. The Global Positioning System (GPS) is a satellite-based system that provides users with real-time position information originally intended for navigational purposes. This system is comprised of a constellation of 24 satellites with sufficient redundancy such that about 6 satellites are typically visible to users at any time or location on the planet. Transmissions from at least 4 satellites must be received in order for users to fix the latitude, longitude and elevation of their position. These satellites were launched by the United States Government Department of Defense. For national security reasons, the government purposely prevents commercial users of the system from attaining the same level of positional accuracy that government users can achieve. This is called Selective Availability (SA). With SA in place, commercial users can fix their position within a radius of 100 meters.

Figure 1:
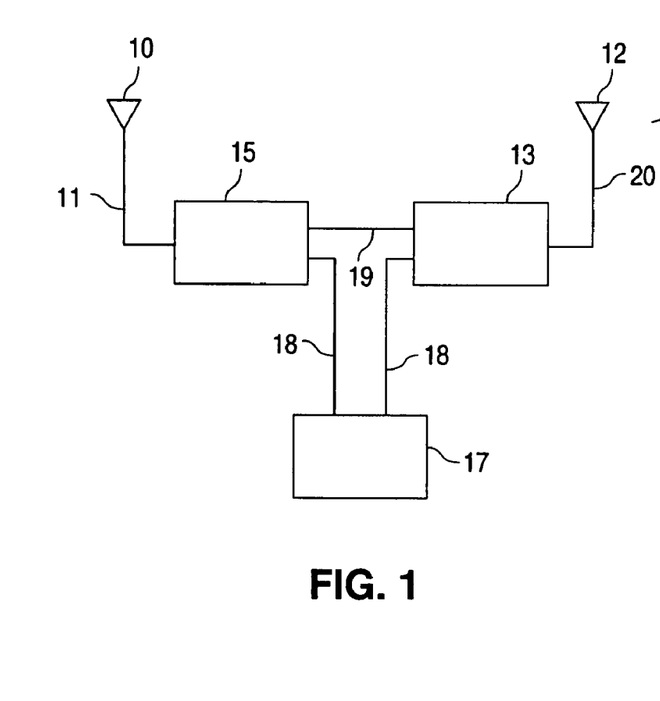
FIG. 1 is a block diagram of a typical prior art DGPS base station.

Differential GPS (DGPS) is a technique, enabled with the addition of a wireless data link, which improves commercial GPS positioning capability by several orders of magnitude. This capability makes DGPS technology practical for many other applications, particularly precision survey, which typically demands sub-meter accuracy. To employ DGPS in a local area, the user must position a GPS satellite receiver at a known location and leave it stationary. This set up is usually called the base (or reference) station. An example of a base station is illustrated in FIG. 1. Satellite signals are received with GPS antenna 10 and the signal is sent to the GPS base station receiver 15 through RF cable 11. Typical GPS receivers are tasked with using the satellite signals to determine their position. GPS base stations already know their position and are therefore capable of performing the traditional positioning task "backwards" in order to compute and assign a correction to individual satellite transmissions that are within the base station's field of view. These corrections are sent to the radio modem transceiver 13 through data cable 19. The radio modem transceiver 13 is connected to the radio antenna 12 through RF cable 20. Power is supplied to the base station GPS receiver and radio modem transceiver from DC battery 17 via power cables 18.

In addition to the deliberately induced SA error, satellite transmissions are also adversely affected (essentially delayed in time) by the atmosphere, ionosphere and by reflected signals that are time delayed as a result of not traveling to the GPS receiver on a straight path. All of these error sources are dynamic which means that the corrections computed by the base station are constantly changing and must be transmitted to the rover units at a continuous rate of typically once per second.

Figure 2:
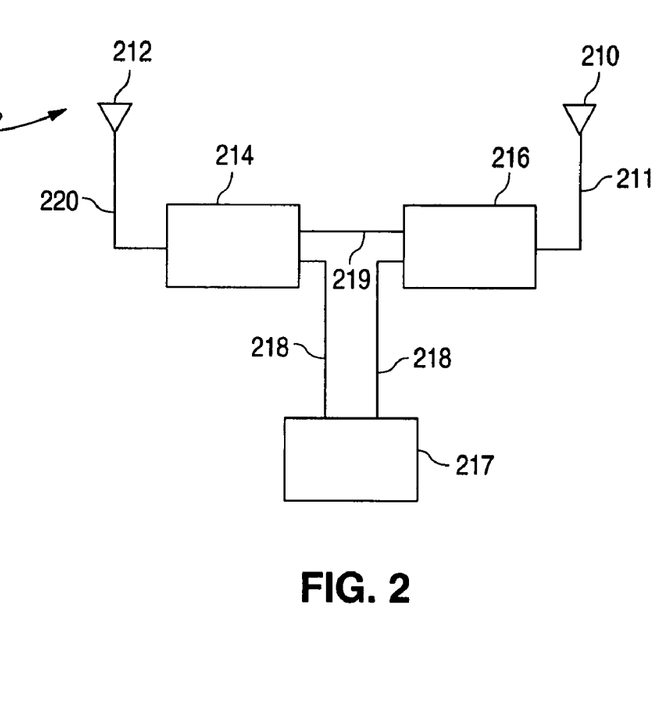
FIG. 2 is a block diagram of a typical prior art DGPS rover station.

To perform precision positioning, e.g. survey activity, with DGPS, it is necessary to also have at least one rover (or mobile) GPS receiver marking the points of interest in the same local area in which the base is located. An example of a typical rover unit is illustrated in FIG. 2. These rover units simultaneously receive the same satellite signals that the base is receiving, through their GPS antennae 210. This signal is conducted to the GPS rover unit satellite receiver 216 through RF cable 211. The position capability of the rover unit is enhanced with the value of the correction to be attributed to each satellite signal that it receives. Radio modem antenna 212 receives the RF signal representing this information that was transmitted by base station radio modem transceiver 13. This signal is conducted to the radio modem receiver 214 via RF cable 220. This data is then sent through data cable 219 to GPS rover unit satellite receiver 216. The system combines the received satellite signals with the satellite corrections that are broadcast to it on the wireless link and is thereby able to compute its position to within a few centimeters. The surveyor operating the rover unit then marks this position and moves to the next.

Survey activities are conducted outdoors and sometimes under extreme environmental conditions. The equipment must be rugged, simple to operate and very reliable. Rover unit equipment must be lightweight, portable and power efficient due to the weight of batteries and the inconvenience of recharging them. The generally accepted practice involves placing the rover unit radio modem receiver, GPS rover unit satellite receiver, and DC battery in a backpack with the radio modem antenna and GPS antenna left external. The radio antenna works best when it is elevated (this increases radio range) and the GPS antenna works best when it has a maximized view of the horizon (this increases the number of satellites that can be received). Hand-held, or backpack-mounted, poles are employed to elevate these antennae as required. It is always desirable to reduce the number of cables (e.g. 211, 220, 218, 219) in the system since these are inconvenient to attach and detach and are invariably sources of reduced performance and system failure.

Base station equipment is typically stationary and mounted on a tripod on high ground for best radio range and satellite field of view. The radio modem typically has a high power transmitter since its main function is to broadcast satellite corrections to the rovers. Even though this station is set-up once at the beginning of the job and left unattended until the end of the job, users prefer this equipment to be simple and highly integrated. When a base station is moved from one location to another it will typically be tossed roughly into the back of a pick up truck which is then driven across an unpaved surface to the next site.

Using narrow band technology for the radio modem, the range of these data links can vary from 2 to 50 miles depending on the terrain and transmission power being used. Narrow band radios have longer wavelengths than most of their spread spectrum counterparts. This gives narrow band a longer line of sight range and better penetration through foliage than is realized by spread spectrum radios in the field. Narrow band radios have the disadvantage of requiring that a license be obtained from the Federal Communications Commission (FCC), or local regulatory body, prior to operation.

Surveyors using DGPS are members of the spectrum community as they share the radio waves with other licensed users, each with different communication requirements. For reasons of precedence and public safety, the FCC gives voice users priority over data (e.g. DGPS) users. To ensure this practice is followed the FCC requires data transmissions to employ Carrier Sense Multiple Access (CSMA) which is an algorithm that first senses whether another transmitter is presently transmitting before it begins its own, potentially interfering, transmission. The FCC also requires transmitters of periodic data to identify themselves every 15 minutes with a Morse code transmission of their FCC call sign. This practice facilitates the reporting of irresponsible transmitters back to the FCC. The FCC has the authority to issue substantial fines and even confiscate the equipment of illegal transmitters.

Figure 3:
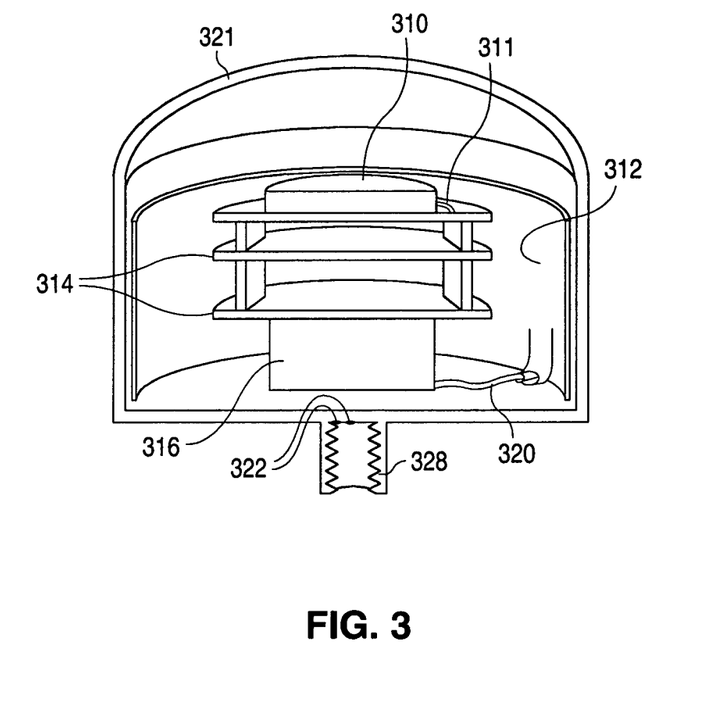
FIG. 3 is a sectional three dimensional view of a prior art integrated DGPS rover station.
Figure 4:
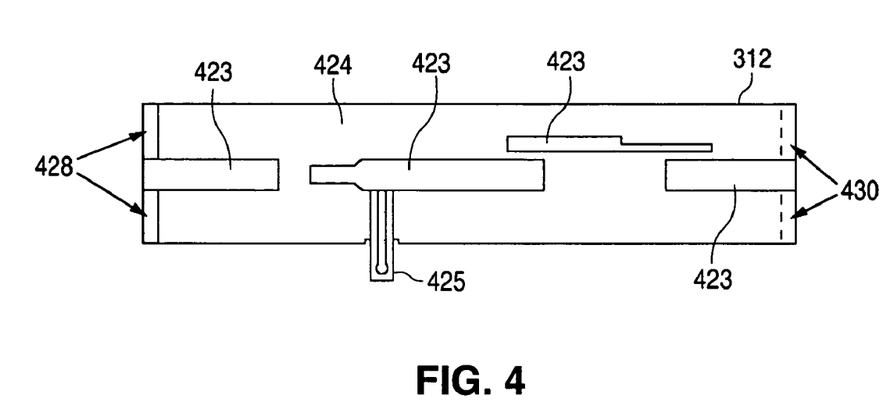
FIG. 4 is an unwrapped view of a prior art internal radio slot antenna.
Figure 5:
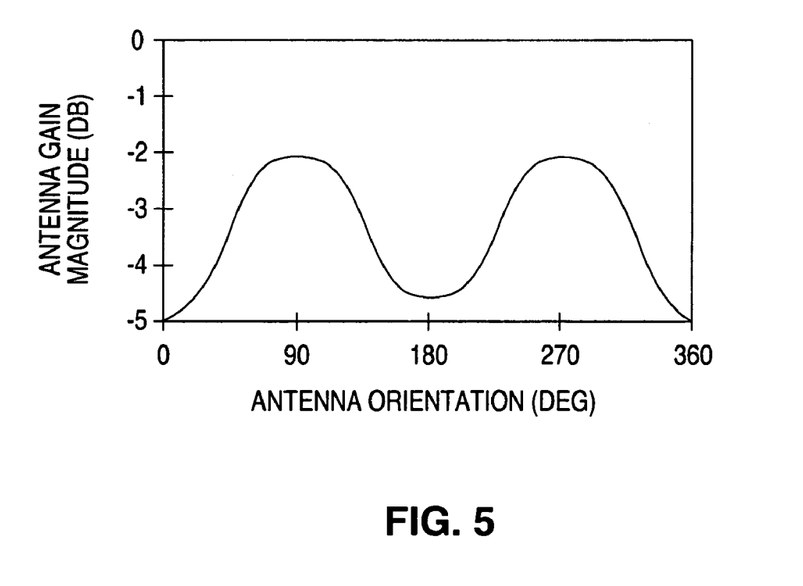
FIG. 5 is an antenna gain versus direction plot for the antenna depicted in FIG. 4.

Manufacturers of GPS receiver equipment have recognized the importance of integrating the radio modem inside their GPS receiver enclosures. Thus far this integration has been limited to the rover systems only and has involved radio modems that are capable only of receiving (e.g. they have no transmitters) data transmissions. One particular example has been reduced to practice by Trimble Navigation Limited (TNL) and is illustrated in FIG. 3. It has the GPS receiver 314, a GPS antenna 310, a receive-only radio modem 316, and an internal radio modem (slot antenna type) antenna 312, all integrated into a single enclosure 321 that mounts on top of a hand-held pole with threaded insert 328. The internal antenna 312 is constructed of a lamination of polymide insulating material and electrically conductive copper tape material. FIG. 4 illustrates the internal antenna 312 in an unwrapped view. The construction of this antenna is such that the receiving elements of the antenna are the areas where there is no copper present 423 surrounded by conductive area 424 where the copper is present. A planar coaxial lead 425 allows the signal to be directed from the antenna to the RF cable 320 shown in FIG. 3. When wrapped, the antenna ends are electrically connected by conductive areas 428, 430. FIG. 5 illustrates the direction gain properties of this antenna that is seen to have 3 dB of variation in its implementation. DC Power is supplied to the system through the pole (not shown) which contains two insulated conductors that make electrical contact between the contacts 322 in the enclosure 321 and the batteries that are placed in the bottom of the pole. These batteries power both the rover GPS satellite receiver and the rover radio modem receiver and provide approximately 4 hours of usable operation in this implementation.

The TNL embodiment described above provides a level of integration that eliminates the need for the surveyor to connect external data cable 219 between the modem and GPS receiver. It additionally obviates the external RF cables 211, 220 between the two antennae and their respective receivers 216, 214. Surveyors have complained that this particular system is top-heavy and unwieldy, being placed at the top of a hand-held pole. This is at odds with the requirement that to achieve precise survey results the GPS antenna must be held stationary since all satellite measurements will be referenced to the center of the surface of the GPS antenna. If the antenna is swaying during these measurements their precision will be reduced. Surveyors prefer the use of a backpack for carrying the heavier components of the rover system.

At present, base station systems are comprised of GPS and radio modem transmitters packaged in separate mechanical enclosures and electrically connected (only) with an external serial data cable. Once set up, the base stations are programmed to transmit their corrections every one second or so continuously without any user intervention. When the radio channel is being shared among many users the DGPS corrections will be buffered up in the memory of the base station radio modem while it continues to sense for the frequency to be clear so that it may transmit the buffered data to one or more rover units. When the channel is finally sensed as clear by the base station transceiver it will transmit a long stream of data comprised of all of the corrections that were collected while the channel was occupied by another user. However, due to the temporal nature of these corrections, the only data that is of any value to the rover GPS receiver will be that set which was most recently calculated by the base GPS receiver.

SUMMARY OF THE INVENTION

In terms of broad inclusion, it is the intention of this invention to provide a user such as a surveyor with a system that is highly integrated, comfortable to use in the field, power efficient, and automated.

A high degree of integration, and opportunity to increase manufacturability with lower cost, is achieved by this invention with the base station GPS receiver packaged in the same environmentally sealed enclosure as the base station transceiver. This invention will also describe an integrated base station antenna system that combines the GPS antenna with the radio modem antenna. The base station system described in this invention is power efficient because it has the ability to only transmit corrections when requested by the rover unit, and then to only transmit corrections that will be the most contemporary (e.g. useful). The base station system described in this invention relieves the surveyor of making a manual and subjective selection of the best channel for the wireless link by providing the provisions for automatic channel selection capability.

According to the invention there is provided a method and apparatus for a base station transceiver to automatically determine which of its pre-programmed channels is most devoid of RF traffic and automatically select it, including the means to manually override this selection, for the transmission of satellite corrections to rover systems. If this channel should subsequently become more active during the survey, the base station transceiver may automatically select another, more vacant, channel.

Further, according to the invention there is provided a method and apparatus to enable the rover radio modem to scan through its pre-programmed channels looking for a valid source of transmitted satellite corrections, from a base transceiver, and to automatically select this channel, including the means to manually override this choice. In the event that these corrections should desist on the selected channel, it is a further object of this invention that the rover radio modem would automatically scan through the available channels again until successful at finding valid signals.

Still further, according to the invention there is provided a method and apparatus for the rover radio modem to request satellite corrections, including a radio transmission that it originates, when the surveyor deems to be in need of corrected satellite transmissions from the base station system. Preferably the base station radio modem transceiver responds to the request for corrections with an appropriate duration of transmissions thereby saving power and spectrum usage by not transmitting unless needed.

A high degree of integration, and opportunity to increase manufacturability with lower cost, is achieved by this invention with the provision for the rover unit radio modem receiver/transceiver, to be packaged in the same environmentally sealed enclosure as its radio antenna. Also, according to the invention there is provided a method and apparatus to package the base GPS satellite receiver in the same mechanical enclosure as the base radio modem transceiver.

Preferably the need for an external data cable between the base GPS satellite receiver and base radio modem transceiver is eliminated.

Further, according to the invention, there is provided means and apparatus for an internal antenna that wraps around the radio modem receiver electronics. The radio antenna design is preferably that of a dipole in parallel with a shorted transmission line. This can include the formation of a dipole antenna that has the feed terminals in the middle and is shorted to ground at its extremities, to prevent a "parallel transmission line effect" from decreasing the antenna efficiency. This antenna arrangement provides higher, and more directionally uniform, gain performance than the prior art. Another embodiment may also include the provision of enclosing the rover GPS antenna in the same package as any combination of the above rover features.

The provision is also made to enclose rechargeable batteries in the same environmentally sealed enclosure as described in any combination of the above rover features. Providing a separate power supply for the rover radio modem receiver/transceiver system allows for increased battery capacity for the overall system which helps enable the surveyor to work for an entire eight hour day without having to re-charge batteries. Preferably the rover modem includes an internal, rechargeable battery that does not draw power from the GPS system battery until it is first depleted.

Further, according to the invention, there is provided means and apparatus for combining and de-combining, on a single conductor, the received RF satellite signals, the serial representation of the demodulated data from the radio containing the satellite corrections, and the DC power required to power remote electronics. Preferably, the single conductor is routed through a hollow radio modem antenna placed below the GPS antenna and radio modem.

The radio modem may include apparatus for displaying various diagnostic and status indications, including the use of a digital display, to the user of the system.

Further, according to the invention, there is provided means and apparatus for controlling the transmitting power output of the radio modem, including the use of a software configuration program, thereby allowing the convenient configuration of the same hardware for usage in different countries with different regulatory and licensing requirements.

Still further, according to the invention, there is provided means and apparatus for adaptively setting the appropriate threshold of received signal strength (squelch), with respect to the background noise level, that allows the detection and receipt of a valid transmission from as great a range as possible.

The rover station described in this invention lowers the overall system power requirement, and requires less spectrum capacity, because it has the ability to request transmissions of satellite corrections from the base only when required by the rover system. The rover station system described in this invention relieves the surveyor of making a manual and subjective selection of the best channel for the wireless link by providing the provisions for automatic channel selection capability.

The reliability of this system is enhanced since the high degree of integration removes the need for various external electrical data, and RF, cables between separate enclosures.

DETAILED DESCRIPTION OF THE INVENTION

Figure 6:
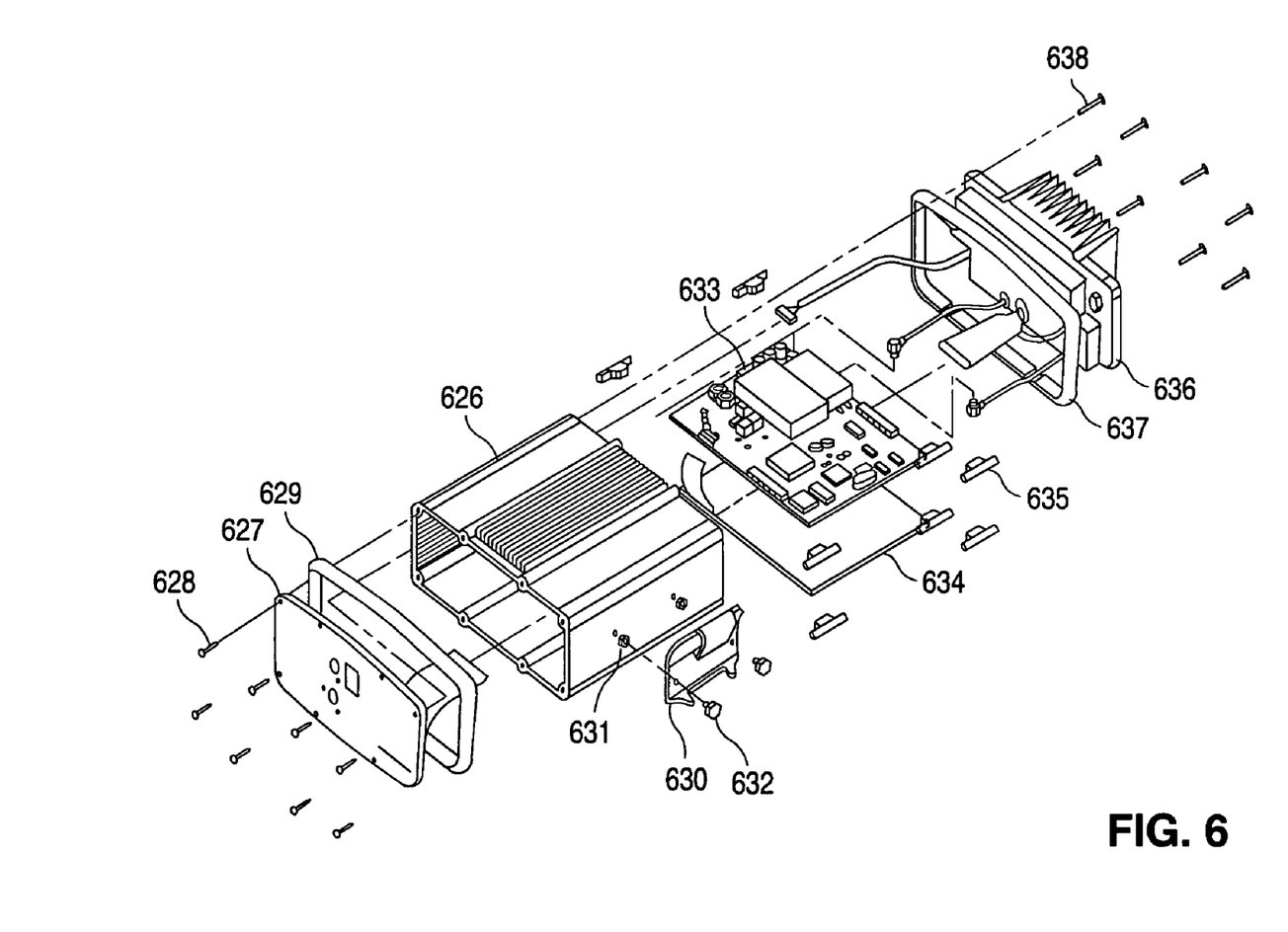
FIG. 6 is an isometric exploded view of one embodiment of a base station unit of the invention.

One embodiment of a base station of the invention is illustrated in FIG. 6. The invention involves putting the base station GPS receiver into the same enclosure as the radio modem that transmits the satellite corrections, as illustrated in FIG. 6. The body of the housing or enclosure 626 is made of extruded aluminum for its lightweight properties, heat conduction capabilities, and electrically shielding ability. The front panel assembly 627 is comprised of an aluminum front panel with provisions for user interface through the use of two push buttons, various Light Emitting Diode (LED) status indicators, and a seven segment numeric display. The front panel assembly attaches to the body of the enclosure with screws 628 and the union is sealed with an elastomeric gasket 629. This gasket 629 also serves to provide a measure of vibration isolation when the station is resting on a flat surface because the elastomeric gasket 629 will provide the supporting contact area for the base station. A mounting hook 630 is designed to screw, by means of screws 632, directly to the side of the enclosure 626 and is environmentally sealed using nylon sleeves 631. The hook 630 enables the base station to be mounted directly on any leg of a standard surveyor's tripod because it is designed to nest inside a loop feature that is already provided on most tripods for such purposes.

The inside of the enclosure 626 is equipped with slots that have been extruded directly into both side walls of the enclosure 626. This facilitates the mounting of the base station radio modem transceiver circuit board 633 and GPS satellite receiver circuit board 634. Elastomeric mounts 635 are designed to physically constrain the position of these two circuit boards and at the same time providing vibration isolation protection for the electronics. Vibration isolation is particularly important for frequency generating devices such as are found on both of these circuit boards 633, 634. Excessive vibration levels will alter the ability of these electronics to generate and receive the frequencies for which they have been designed. This will degrade their performance in such environments. Protection from mechanical shock is also obtained from these elastomeric mounts. This enhances the durability of the electronics that might otherwise be damaged by accidental dropping in the field.

The base station further includes an amplifier assembly 636, which is comprised of an extruded aluminum section that has been machined to heat sink and mount the transmitter amplifier electronics. An elastomeric gasket 637 serves to seal the union of the amplifier assembly 636 and the enclosure body 626, in addition to providing vibration isolation as described above with regards to the front panel assembly. The amplifier assembly 636 is secured to the enclosure body 626 by means of screws 638.

In a preferred embodiment, the radio modem transceiver uses a data byte stored in memory to set the output of a digital to analog converter that is used to bias a transistor in the power output stage of the transceiver. Some countries in Europe allow more Radio Frequency (RF) power output than others. It is desirable to use the maximum RF power permissible in order to increase the range of the wireless link. This feature allows the factory, or certain European master distributors, to configure the transceiver for each particular country just before it is shipped.

The rear surface of the amplifier assembly allows access to RF antenna connections. One embodiment of this invention employs separate antenna connections for both the radio modem transceiver and GPS satellite receiver. In another implementation of this invention, a single external RF connection is provided with an internal signal combiner/decombiner to route the radio and GPS signals to their respective electronics. The rear surface of the amplifier assembly also provides external access to data (required only for diagnostics purposes when the GPS receiver is integrated directly into the same enclosure as the base station radio modem transceiver) and power connectors. Additional internal electronic connections between various circuitry described above are made with flexible cables.

An alternative embodiment of the above invention (not shown) would involve separate, upper and lower, chambers extruded in the body of the enclosure that would improve electromagnetic shielding between the GPS satellite receiver and base station radio modem transceiver. This alternative embodiment may also have improved non-intentional radiation performance as measured externally. Various regulatory bodies publish certain maximum levels of non-intentional external radiation that must be achieved to obtain type approval in their respective countries.

Another feature of the invention is to implement the rover unit radio as a transceiver. By doing so, optimal use is made of the spectrum because the satellite corrections will not be transmitted from the base station to the rover unit unless they are first requested by the rover unit, and then only for a period of time that is sufficient for the rover unit to correct its position. In this embodiment, the rover unit and base station are both equipped with radio modem transceivers. The base station satellite receiver continuously receives satellite signals, computes the corrections, and passes them to the base station radio modem transceiver. However, the base station radio modem transceiver will not transmit unless it has first received a signal from the rover unit that it is ready to receive them. This invention has the further advantage of having improved power efficiency. A large percentage of the power consumed at the base station is spent powering the transmissions of the radio modem. If these transmissions were to be reduced in number such that they only occurred when requested by the rover unit, the base station battery could be made smaller and would last longer between charges. It has the further advantage of making the spectrum more available for other local area network requirements such as two way messaging between members of the network.

Figure 7:
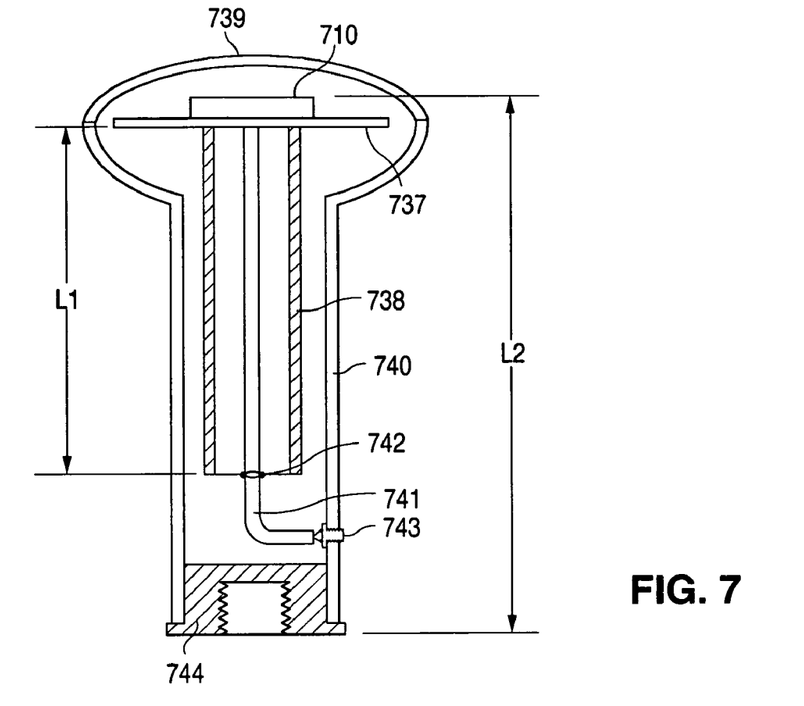
FIG. 7 is a sectional side view of a base station unit showing a GPS antenna combined with a radio antenna, according to the invention.

FIG. 7 illustrates a novel base station that combines the GPS satellite antenna 710 with the radio modem transceiver antenna 738. The sensing element of the GPS antenna 710 is positioned within an enclosure 739 made of material that is especially transparent to the frequencies of GPS satellite transmissions. This sensing element is soldered to a circuit board 737, which can also act as a ground shield, and that separates this element from the hollow radio modem antenna element 738. Included on the circuit board 737 is circuitry that preamplifies and filters the signals from the antennae as well as providing combining and decombining means to route the signals to and from the single coaxial cable 741 in the system as required. The radio modem antenna 738, in this embodiment, takes the form of a monopole antenna of length $L_1$ where $L_1$ is an integral fraction of a wavelength, in the middle of the band, of the radio modem carrier frequency. Another embodiment (not shown) is contemplated where the hollow radio antenna element is arranged as a dipole with the two halves joined at the midway point of $L_1$ with a small Balun circuit to balance the impedance of the two antenna terminals. The leads from the antenna elements to the Balun circuit can be any electrical conductor, but preferably take the form of a mechanically robust arrangement (e.g. screw contacts) instead of flimsy wire leads that have impedance that is difficult to control and compensate for. This signal would then be combined and decombined with the GPS antenna signal as before. As mentioned above, the circuit board 737 can act as a ground shield, which grounds one end of the radio modem antenna 738. In the case of a monopole, as illustrated in FIG. 7, only one end of the antenna is grounded, the other end constituting the signal end of the antenna. In the case of the dipole arrangement, it is necessary to connect both unterminated ends of the hollow radio modem antenna to system electrical ground 742 in order to avoid the arrangement of a conductor within a conductor from behaving like a transmission line and parasitically reducing the gain of the radio antenna. The unterminated ends of a dipole antenna are illustrated schematically in FIG. 9 by the triangular ends of the elements 850, 851. The coaxial cable 741 is terminated at a RF connector 743. The coaxial cable extends through the center of the hollow antenna construction wherein the external ground shield of the cable is connected to one or both ends of the antenna elements so as to avoid the parallel transmission effect. In the case of a monopole, it is, in fact, desirable to ground the lower end, thereby leaving the signal end at the top, in close proximity to the circuit board 737.

The enclosure 740 is made of a material that is particularly transparent to the frequencies of the radio modem transmissions. In one embodiment, the radio modem antenna, instead of being mounted inside the enclosure 740, takes the form of a thin conductive layer on the outside of the enclosure. Yet another construction would include the enclosure itself being electrically conductive and comprising the radio modem antenna. The invention is designed to be mounted directly on the end of a standard surveyor range pole by virtue of the threaded insert 744 located at the bottom of the assembly. The length $L_2$ is required for the surveyor for calibration.

Most base stations are programmed with more than one licensed frequency in the memory of the modem. In the prior art, the user typically uses his or her best judgment during set up to determine and select the frequency that is the most vacant. This is usually done in the prior art by listening for an audio response on a speaker connected to the output of the data modem or by listening to a hand held radio scanner. Clearly it is desirable to choose such a low traffic frequency so that the transmitters employing CSMA will not be forced to regularly hold off their transmissions until the channel is clear, which would be disruptive to the rover unit that may be waiting for the corrections in order to make a position fix. The problem is made worse if the base station is left to operate unattended, and the initial choice of channel subsequently becomes more active. This would force a surveyor to have to return to the base unit and change it to another channel if warranted by the increased radio traffic.

The present invention employs an algorithm that allows the base station to automatically select the frequency for data communication, from among its pre-programmed channels, that is the least used for a given time and location. When first turned on, the radio modem controller listens to the Received Signal Strength Indicator (RSSI) of the radio for a certain period of time, e.g., 10 seconds or 1 minute or other suitable period that allows a determination to be made on each of the pre-programmed channels. The RSSI is an analog voltage that indicates the signal strength on the channel of interest. During this sampling period, the modem controller determines the quiescent level of energy as well as the time duration and magnitude of any other transmissions that may occur. After listening to each channel the modem selects the quietest channel and begins to transmit its corrections. This initial delay is not an inconvenience to the surveyor because the GPS equipment typically requires at least this much time to initialize and acquire the signals of the satellites in view. After this initial sequence, if another transmitter should begin transmitting on this channel and invoke a CSMA transmission delay by the base, the base will initiate the channel scan routine again and change frequencies if appropriate.

In one embodiment, the transceiver is equipped with a Received Signal Strength Indicator (RSSI) that produces an analog voltage that is representative of the amount of RF energy present within a one channel width band of frequency that is centered on the carrier frequency presently selected by the receiver. Circuitry including an A-D converter in the transceiver converts this signal to a digital number for use by an internal microprocessor. The least active channel is selected on the basis of an algorithm that measures the RSSI level every 1 mSec and accumulates the data for a one-minute period on each channel. The channel with the lowest sum will be selected after each channel has been measured. The individual RSSI measurements are accumulated using weighting factors as they are added to the running total during the integration period. The weighting factor increases with signal strength. The algorithm does this to account for the fact that the presence of a strong signal interferer usually indicates that this channel is in active use locally by another system and data collisions or radio hold off could result if this channel were selected. If data is accumulated for 1 minute for each channel, it will be appreciated that to pre-program 16 channels in the transceiver, this algorithm will require 16 minutes to scan each channel before selecting the quietest. In this embodiment, the algorithm begins with the lowest channel number and advances sequentially through the table. The base will automatically begin transmitting at the conclusion of the algorithm. It will be appreciated that radio traffic on a given channel will change over time. An enhancement to the algorithm, that could be selectively enabled or disabled, would be to allow automatic re-scan under certain conditions. One example might include that Carrier Sense Multiple Access (CSMA) was invoked thereby indicating the presence of an interferer. Another example might include allowing the RSSI integration routine to operate in the background, on the channel of interest, between transmissions. A re-scan could be triggered in the event that background energy exceeds some threshold relative to the sum that originally selected this channel as the quietest.

Figure 8:
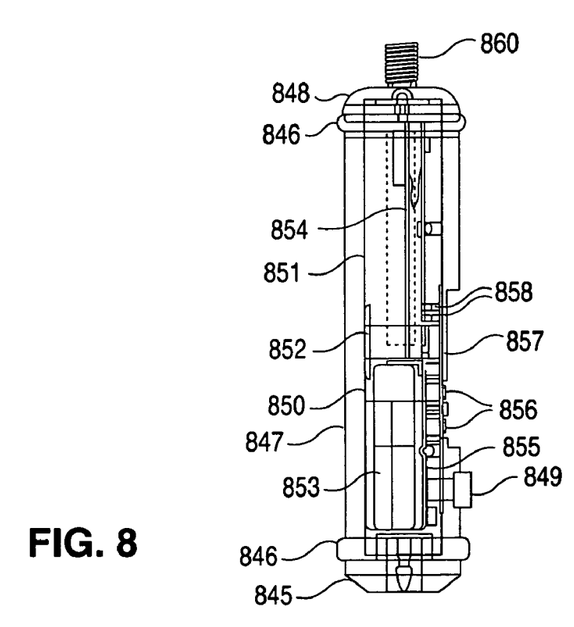
FIG. 8 is a transparent view of one embodiment of a rover unit of the invention.

FIG. 8 illustrates a transparent view of one embodiment of a rover unit of the invention. This rover unit is designed to be mounted directly onto a standard surveyor's pole and is equipped with bottom end cap 845 with a threaded insert to facilitate this connection. The bottom end cap 845 seals against an injection molded housing 847 by means of an elastomeric gasket 846. The housing 847 is made from a material that is practically transparent to radio frequencies to facilitate the functionality of the internal dipole antenna that is comprised of a bottom half receiving element 850 and a top half receiving element 851. The impedance of these two halves is matched and filtered with a Balun circuit board 852 that joins the two halves mechanically and electrically. A top end cap 848 is environmentally sealed to the housing 847 by means of an elastomeric gasket 846. The end caps 845, 848 are drawn tight to the respective ends of the housing 847 by means of screws (not shown). An internal RF cable (not shown) connects the output of the Balun circuit board 852 to the input of the rover radio modem circuit board 854. A threaded stud 860 is incorporated into top end cap 848 to permit a third party GPS antenna (not shown) to be threaded directly on top of the rover unit.

An alternative embodiment (not shown) uses a different top end cap with an integral RF connector attached to it for the purpose of mounting an external radio antenna directly to the top of the rover unit. This embodiment would not require the internal antenna receiving elements 850, 851 or the balun circuit board 852.

The rover unit of the invention is powered with an internal battery 853. Data and external power can be provided to the unit through an external connector 849. This port also allows the charging of the internal battery 853. An interface circuit board 855 facilitates connections to various user interface components such as pushbuttons 856, seven segment digital display 857, and status indicator LEDs 858. A flexible ribbon cable (not shown) connects the interface circuit board 855 to the rover radio modem board 854. The interface board 855 also has spring-loaded contacts (not shown) that electrically connect the opposite ends of the internal antenna receiving elements 850 and 851 to system ground. This is necessary in order to avoid the arrangement of a conductor within a conductor from behaving like a transmission line and parasitically reducing the gain of the radio antenna.

Figure 9:
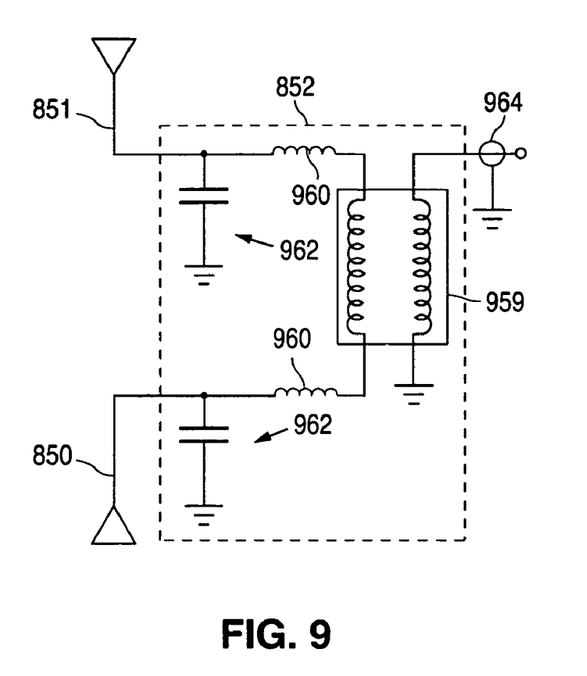
FIG. 9 is a schematic representation of an internal antenna of the invention.

The dipole embodiment of the radio modem antenna is represented schematically in FIG. 9. A Balun 959 is mounted on the Balun circuit board 852 with impedance matching passive components, comprising inductors 960 and capacitors 962 on the front end. The output of Balun 959 feeds an internal coaxial cable 964 which connects to the radio modem circuit board 854, shown in FIG. 8. This rover radio modem can be embodied as a radio receiver only or as a radio transceiver.

In a preferred embodiment, the rover unit sets the threshold of its squelch one or two decibels above the noise floor in a given environment. The squelch threshold is the level of the RSSI signal that triggers the receiver to scrutinize the received RF energy to see if valid data is present. The receiver or transceiver can employ an algorithm to determine the appropriate level either by making an initial scan of the background RSSI when it powers up, or alternatively between valid transmissions, on an ongoing basis.

Figure 10:
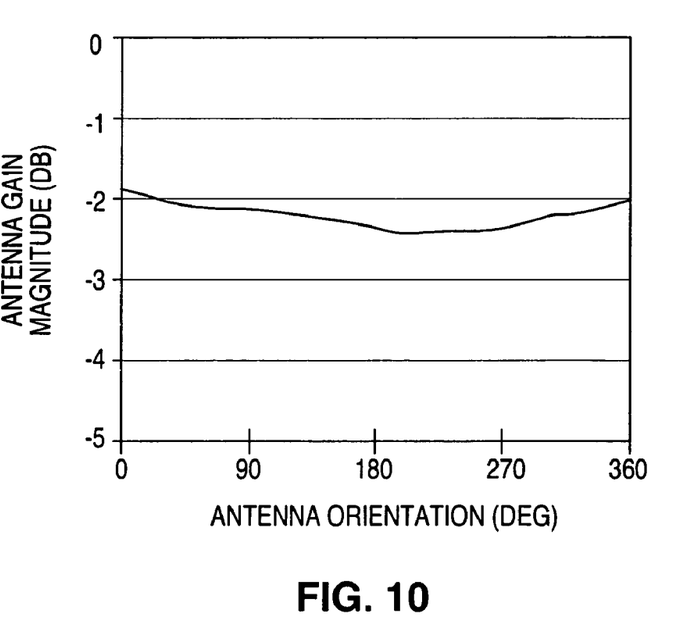
FIG. 10 is an antenna gain versus direction plot for the antenna of the invention.

FIG. 10 illustrates the gain of the internal dipole antenna shown in FIG. 8, as a function of angular orientation. The omni-directionality of this antenna is better than +/−1 dB and the nominal gain value is approximately −2 dB with respect to a perfect dipole antenna.

The rover GPS system spends a relatively small percentage of the total job time actually collecting data at the desired point. The majority of the time spent is consumed by moving from one location to the next. This invention allows the surveyor operating the rover GPS system to move to the desired location, get set up, and then push a button that will initiate a transmission from the rover unit to the base station. This will signal the base station to begin transmitting satellite corrections for a pre-determined period of time, typically on the order of two to three minutes. The base radio modem will respond by transmitting to the rover unit the current corrections calculated during this period of time. The base radio modem will discard the corrections that are computed between requests for data.

The rover radio modem controller also has automatic channel selection capability. When it is first turned on, an algorithm is invoked that will spend a certain period of time, e.g., 3 or 10 seconds, receiving on each channel before advancing itself to the next pre-programmed channel until it detects valid DGPS broadcasts. DGPS broadcasts are typically made once every second. The DGPS transmissions are identifiable by a unique protocol such that the receiver is able to distinguish valid DGPS data from other sources of radio frequency energy that may be present on the channel being listened to. The receiver will continuously scan through the list of channels and will stop immediately when a valid transmission has been recognized. In another embodiment, the algorithm has the receiver scan through its entire table before selecting the channel that had the strongest signal, in the event that the receiver was in range of more than one transmitter. A refinement of this algorithm might have the receiver automatically scan again in the event that no new signals are received for a given amount of time, for example, one minute. Thus, if the rover radio modem should subsequently stop receiving broadcasts on the automatically selected channel, the rover radio modem will resume the automatic channel selection routine on the assumption that the base station radio modem has changed to a new, less active, channel.

In the prior art, rover units typically use separate mounting means (hand held or backpack mounted) for the GPS antenna and the radio modem antenna. However, the RF cables carrying signals from antennae to their respective receivers are easily broken or improperly connected and are likely to cause system performance degradation when abused. Therefore the present invention proposes the integration into single enclosures and the elimination of cables.

Figure 11:
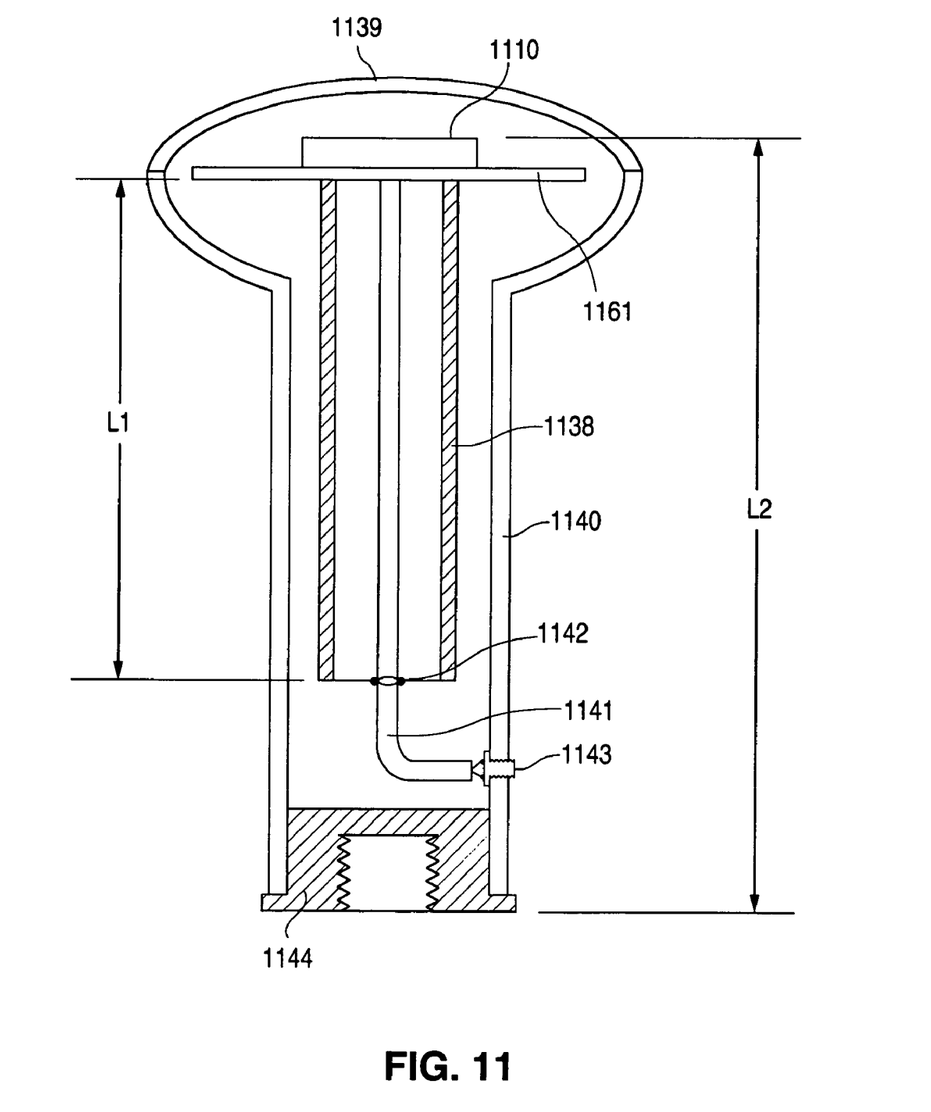
FIG. 11 is a sectional side view of another embodiment of a rover unit of the invention.

FIG. 11 illustrates an alternative embodiment of the rover unit system that allows near optimal positioning of the two antennae in the system by combining them in a single enclosure that mounts on a standard surveyor pole. The sensing element of the GPS antenna 1110 is positioned within an enclosure 1139 made of material that is especially transparent to the frequencies of GPS satellite transmissions. This sensing element is soldered to a radio circuit board 1161 that also acts as a ground shield, and that separates this element from the hollow radio modem antenna element 1138. Included on circuit board 1161 is circuitry that preamplifies and filters the signals from the antennae 1110, 1138 as well as providing combining and decombining means to route the signals to and from the single coaxial cable 1141 in the system as required. Also included on radio circuit board 1161 are all of the electronics for a radio modem receiver. A monopole antenna of length $L_1$ is shown where $L_1$ is an integral fraction of a wavelength, in the middle of the band, of the radio modem carrier frequency. Another embodiment (not shown) is contemplated where the hollow radio antenna element is arranged as a dipole with the two halves joined at the midway point of $L_1$ with a small balun circuit to balance the impedance of the two antenna terminals. This signal would then be combined and decombined with the GPS antenna signal as before. It is necessary to connect the unterminated end of the hollow radio modem antenna 1138 to system electrical ground 1142, as discussed above with respect to the base station, in order to avoid the arrangement of a conductor within a conductor from behaving like a transmission line and parasitically reducing the gain of the radio antenna 1138. The coaxial cable 1141 is terminated at an RF connector 1143. The enclosure 1140 is made of a material that is particularly transparent to the frequencies of the radio modem transmissions. The invention is designed to mount directly on the end of a standard surveyor range pole by virtue of the threaded insert 1144 located at the bottom of the assembly. The length $L_2$ is required for the surveyor for calibration.

It is possible to combine the GPS signals having carrier wavelengths that are an integral fraction of L1 and L2, and are above 1 Ghz, as well as the serial data received by the radio modem (at baud rates of about 38,400 bits per second) and the dc power required to drive the electronics, in a single, shielded, conductor. This reduces all external cabling requirements to a single coaxial cable. An alternative embodiment of this invention would include multiple electrical contacts and a multiple contact external connector, and would not require apparatus for a combiner and decombiner. It will be appreciated that the structure of the rover unit of FIG. 7 is essentially identical to that of the base station shown in FIG. 11, and any discussion of the structure of the base station antennae embodiments and embodiments of electrical connections, apply also to the rover unit. In a network of position-aware members that are able to communicate amongst each other, the roles of rover unit and base station can be varied to best advantage with an aim to make sure a rover unit receives correction data from the base station that it is nearest to. Maximum accuracy, integration and reliability are achieved when a radio transceiver and GPS receiver are packaged in the same enclosure. Reducing the number of connectors and cables increases the reliability of the system. Additionally, a more cost competitive system results when these two previously separate functions are merged into a single package.

Figure 12:
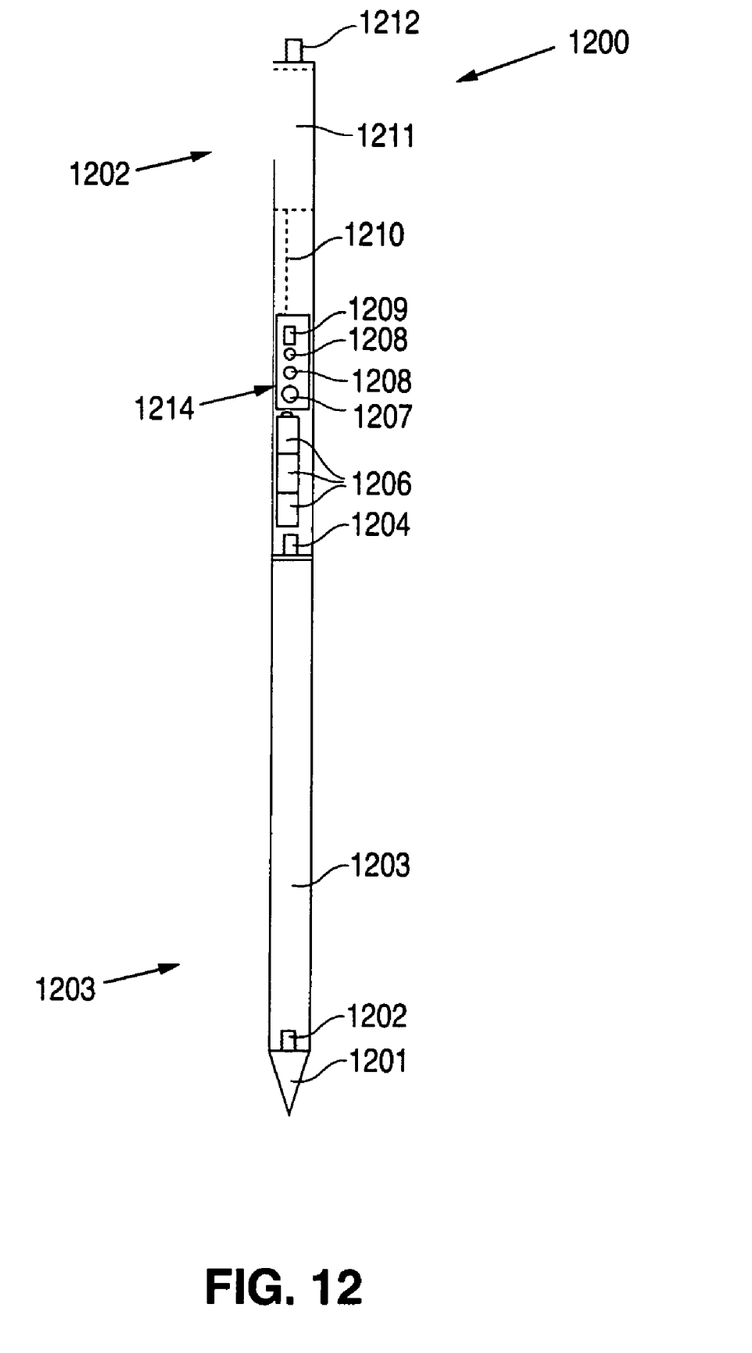
FIG. 12 is a sectional side view of yet another embodiment of a rover unit of the invention.

Yet another embodiment of a rover unit is shown in FIG. 12. Instead of arranging the internal radio modem antenna so as to surround the radio modem circuit board and internal battery, as was the case in the embodiment of FIG. 8, the embodiment if FIG. 12 provides a stacked configuration. FIG. 12 shows a rover radio receiver modem system that is completely integrated into a survey range pole 1200. The survey pole 1200 is divided into an upper section 1202 and a lower section 1203. The lower section engages mechanically with the upper section using an industry standard threaded coupling 1204. It is standard practice for a survey range pole to be separable into two pieces because the combined length is typically 2 meters in length which makes it inconvenient to transport and store when the survey pole is not in use. It is also standard for a removable hardened point 1201 to be attached to the lower section of the survey pole with an industry standard threaded coupling 1202. The material used for the body of the survey pole is typically aluminum although this invention is not so limited and includes other materials, e.g., composite laminates including graphite, Kevlar and fiberglass. These materials have the advantage of being stiff but still light in weight. These considerations are important in the field because survey poles are hand held by the surveyor.

In this embodiment of the rover unit of the invention, the upper section 1202 of the survey pole 1200 contains a rover radio modem receiver system. This system is comprised of a power supply in the form of batteries 1206 that are contained inside the pole 1200, battery charging electronics (not shown) contained inside the pole, an externally accessible radio modem user interface 1214, radio modem receiver electronics 1210 inside the pole, a radio receiver antenna 1211 that may be contained inside the pole, or alternatively, wrapped on the outside of the pole 1200 or formed integrally with the pole 1200 from an electrically conductive material, and an electrical connection (not shown) between the radio antenna 1211 and the radio receiver modem electronics 1210. The top portion of the upper section 1202 of the survey pole 1200 features an industry standard threaded coupling 1212. This threaded coupling 1212 provides the means for attaching a Global Positioning System (GPS) satellite receiver system (not shown in this figure) to the top of the survey pole 1200.

If the upper section 1202 of the survey pole 1200 is made of an electrically transparent material, such as combinations of fiber glass or Kevlar, the radio receiver modem antenna 1211 can be contained inside the pole. If the pole material is electrically conductive, such as aluminum or graphite combinations, then the radio receiver modem antenna will be external, but in close proximity to, the survey pole.

The externally accessible radio modem user interface 1214 is an injection molded plastic frame which provides mounting means for the internal radio modem receiver electronics, a data/power electrical connector 1207, push buttons 1208 for controlling the radio modem receiver electronics, and a display window 1209 that allows the status of the radio modem electronics to be displayed. The status conditions include power on and off indicia as well as the selected channel number of the radio modem receiver.

The batteries 1206 contained in the pole provide power to the internal radio modem receiver electronics in addition to the GPS satellite receiver system (not shown). The data/power connector 1207 provides the means for this power to be routed out of the pole to the GPS satellite receiver system. This same connector also allows the flow of differential GPS correction data that has been received over the air by the radio modem receiver system to be passed on to the GPS satellite receiver system for accurately determining the position of the geographical point being surveyed.

The internal batteries 1206 can be charged through the data/power connector 1207. In another embodiment the internal batteries 1206 are charged through non-contact means, such as through the use of inductive pick up coils, that are incorporated in the upper section 1202 of the pole.

It is to be understood that the invention is not limited to the embodiment illustrated and described since it may be embodied in various forms within the scope of the claims of this patent.

What is claimed is:

1. A base station in communication with a rover unit for use in a Differential Global Positioning System (DGPS), comprising a radio modem transmitter or transceiver having a plurality of pre-defined communication channels, a GPS satellite receiver, and channel selection means for automatically determining which of its pre-defined communication channels is most open to RF traffic and selecting said channel, wherein the communication channels include a Received Signal Strength Indicator (RSSI) and the channel selection means includes an algorithm that measures the RSSI value for each pre-defined communication channel and includes instructions for re-measuring the RSSI values of the pre-defined channels in response to a predefined increase in communication traffic, wherein the openness to transmission of a valid GPS correction information is based on the amount of communication traffic on the channels.

2. A base station of claim 1, further comprising means for manually overriding the selected channel.

3. A base station of claim 1, further comprising an internal processor, wherein an analog signal from the RSSI is converted to digital form by an A-D converter for use by the processor in selecting a channel.

4. A base station of claim 1, further comprising means for controlling the transmitting power output of the radio modem transmitter or transceiver.

5. A rover unit for use in a Differential Global Positioning System (DGPS), comprising a radio modem transceiver, and a radio antenna, wherein the radio modem transceiver and radio antenna are packaged in a single housing with the radio antenna forming a tubular structure around the radio modem transceiver, further comprising a GPS satellite receiver attachable to the housing, wherein the radio modem transceiver and radio antenna are arranged in a stacked configuration in the same housing.

6. A rover unit of claim 5, further comprising a power supply packaged into the same housing.

7. A rover unit of claim 5, wherein the radio modem transceiver and radio antenna are housed in a housing that is transparent to radio frequencies.

8. A rover unit of claim 5, wherein the radio antenna is mounted on an outer surface of the housing or is formed integrally with the housing.

9. A rover unit of claim 5, wherein the radio modem transceiver and power supply are packaged in a survey range pole and the antenna is packaged in the range pole or mounted on an outer surface of the pole or formed integrally with the pole.

10. A rover unit of claim 9, wherein the survey range pole includes a first section and a second section that are releasably connectable end to end.

11. A rover unit of claim 9, wherein the power supply includes at least one rechargeable battery.

12. A rover unit of claim 11, further comprising battery charging electronics packaged in the survey range pole.

13. A rover unit of claim 9, wherein the pole includes a coupling for connecting a GPS satellite receiver system to the pole.

14. A method for performing differential global positioning involving a base station and a rover unit, comprising the steps of:

selecting at the base station from a set of pre-defined communication channels, a channel that is most open for the transmission of data and transmitting GPS correction information on the selected channel and scanning at the rover unit a set of pre-defined communication channels to locate a channel which is carrying valid GPS correction information, further comprising the step of returning to the scanning step when the transmission of the valid GPS correction information ceases on a selected channel, wherein the openness to transmission is based on the amount of communication traffic on the channels.

15. A method of claim 14, wherein the GPS correction information is sent in response to a request from the rover unit.

16. A method of claim 14, further comprising a step of reselecting a channel at the base station in response to pre-defined conditions.

17. A method of claim 16, wherein one of the pre-defined conditions is that the previously selected channel experiences a pre-defined increase in communication traffic.

18. A method of claim 14, further comprising the step of adjusting the power at which the GPS correction information is transmitted, in response to regional requirements.

* * * * *